(12) United States Patent
Duke et al.

(10) Patent No.: US 10,480,498 B2
(45) Date of Patent: Nov. 19, 2019

(54) SELF VENTING PISTON PLUGS

(71) Applicants: Bryan Duke, Painted Post, NY (US); Malcolm Cliff, Painted Post, NY (US); Christopher Gowdy, Corning, NY (US); Robert Hostottle, Painted Post, NY (US); Bryce Sheffler, Athens, PA (US)

(72) Inventors: Bryan Duke, Painted Post, NY (US); Malcolm Cliff, Painted Post, NY (US); Christopher Gowdy, Corning, NY (US); Robert Hostottle, Painted Post, NY (US); Bryce Sheffler, Athens, PA (US)

(73) Assignee: DRESSER-RAND COMPANY, Olean, NY (US)

( * ) Notice: Subject to any disclaimer, the term of this patent is extended or adjusted under 35 U.S.C. 154(b) by 403 days.

(21) Appl. No.: 14/202,001

(22) Filed: Mar. 10, 2014

(65) Prior Publication Data

US 2017/0009757 A1    Jan. 12, 2017

Related U.S. Application Data

(60) Provisional application No. 61/780,544, filed on Mar. 13, 2013.

(51) Int. Cl.
*F04B 39/00* (2006.01)
*F04B 53/12* (2006.01)
(Continued)

(52) U.S. Cl.
CPC .......... *F04B 39/0016* (2013.01); *F04B 39/16* (2013.01); *F04B 53/06* (2013.01); *F04B 39/1006* (2013.01); *F04B 53/12* (2013.01)

(58) Field of Classification Search
CPC ..... F04B 53/1002; F04B 53/12–53/129; F04B 39/1006; F04B 39/0016; F15B 15/204; F16J 1/09
(Continued)

(56) References Cited

U.S. PATENT DOCUMENTS 1,627,908 A * 5/1927 Keena ..................... B60C 29/06
138/89.3
3,230,977 A * 1/1966 Mercier .................... F15B 1/24
138/31
(Continued)

FOREIGN PATENT DOCUMENTS

CN        00002118831 U    10/1992
KR     1020070060824 A     6/2007

*Primary Examiner* — Thomas E Lazo
*Assistant Examiner* — Michael Quandt

(57) ABSTRACT

A piston plug includes a cylindrical body having a longitudinal axis and an outer cylindrical surface. The outer cylindrical surface extends longitudinally between a first surface and a second surface opposite the first surface. The outer cylindrical surface defines a hole extending radially inward. The hole has a central axis perpendicular to the longitudinal axis of the cylindrical body. A first channel and a second channel are defined by cylindrical body. The first channel is in fluidic communication with the first surface and the hole. The second channel is in fluidic communication with the second surface and the hole. The first channel, the second channel, and at least a portion of the hole form a non-collinear flowpath. The piston plug is disposed in a plug hole in a piston and is retained in the plug hole via an interference fit between the piston plug and the plug hole.

5 Claims, 4 Drawing Sheets

(51) Int. Cl.
    *F04B 53/06*      (2006.01)
    *F04B 39/16*      (2006.01)
    *F04B 39/10*      (2006.01)

(58) Field of Classification Search
    USPC ........................................ 92/181 R
    See application file for complete search history.

(56) References Cited

U.S. PATENT DOCUMENTS

| | | | | |
|---|---|---|---|---|
| 3,367,270 | A * | 2/1968 | Schlosser | F04B 43/067 |
| | | | | 417/388 |
| 3,405,697 | A * | 10/1968 | Marchand | F02B 75/044 |
| | | | | 123/47 R |
| 4,237,948 | A * | 12/1980 | Jones | B21H 3/025 |
| | | | | 411/307 |
| 4,515,343 | A * | 5/1985 | Pischinger | F01L 1/16 |
| | | | | 123/90.11 |
| 6,109,251 | A | 8/2000 | Haberlein et al. | |
| 6,668,862 | B2 * | 12/2003 | Maezawa | F16K 15/021 |
| | | | | 137/532 |
| 7,984,702 | B2 | 7/2011 | Russell | |
| 9,140,292 | B2 * | 9/2015 | Lu | F16B 39/28 |
| 2006/0180209 | A1 | 8/2006 | Riley et al. | |
| 2010/0303645 | A1 | 12/2010 | Ohata et al. | |

\* cited by examiner

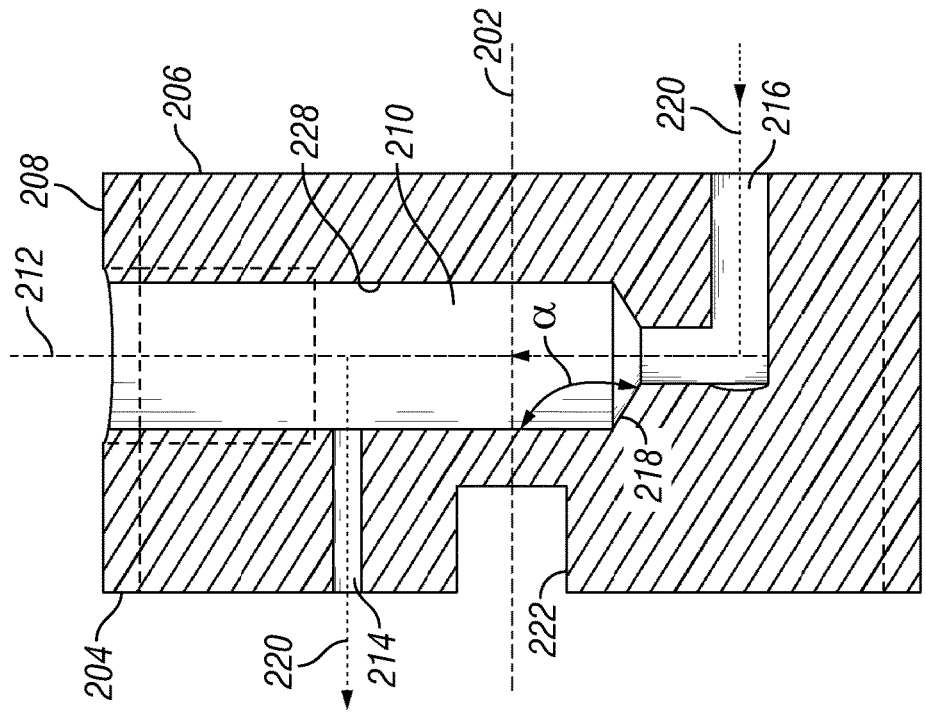
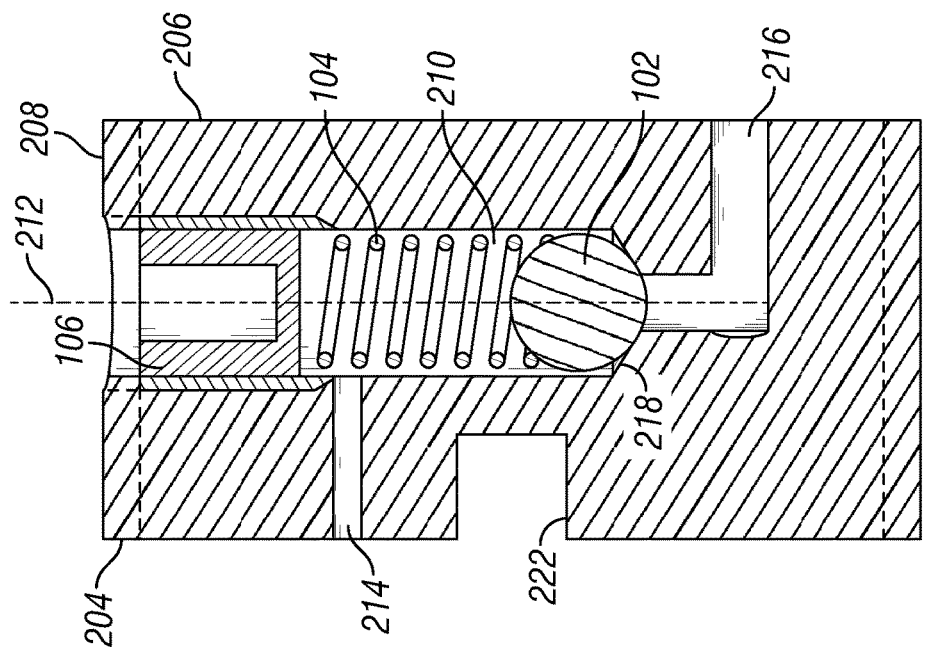

US 10,480,498 B2

SELF VENTING PISTON PLUGS

CROSS-REFERENCE TO RELATED APPLICATIONS

This application claims priority to U.S. Provisional Patent application having Ser. No. 61/780,544, which was filed Mar. 13, 2013. This priority application is hereby incorporated by reference in its entirety into the present application to the extent consistent with the present application.

BACKGROUND

A reciprocating compressor (for example, a high speed reciprocating compressor) is an example of a positive-displacement compressor that uses one or more pistons driven by a crankshaft to deliver working fluids (for example, gases) at high pressure. Generally, the pistons are hollow and have a cavity therein. The reciprocating compressors typically operate to deliver compressed gases having a pressure from about 50 psi to about 2000 psi. Due to this high-pressure operation, gas may enter the cavity of the piston, and the pressure of the gas in the cavity may build over time.

Generally, as per the safety standards set forth by the American Petroleum Institute (API), any chamber or cavity must be vented (for example, to equalize the pressure in the cavity with the outside pressure). In addition, to prevent excessive wear of parts any debris, such as casting sand, grit, debris due to machining, etc., within a chamber or cavity be contained therein and should not exit the cavity. In order to satisfy these requirements, piston valves or plugs are typically installed on an outer surface of the piston to vent the piston cavity by providing a flowpath for the gas in the piston cavity to exit the piston cavity.

FIG. 1A illustrates a cross-sectional view of a conventional piston plug 100. FIG. 1B illustrates a cross-sectional view of a piston 110 in which the piston plug 100 has been installed in a plug hole 128 defined by an outer surface 124 of the piston 110. Referring to FIGS. 1A and 1B, the piston plug 100 has a ball 102 and a spring 104 axially disposed in a through hole 108 axially defined by the piston plug 100. The ball 102 and the spring 104 are secured in the through hole 108 via a fastener 106. The piston 110 is disposed to reciprocate axially in a bore 114 in a cylinder 112. A fluid chamber 116 is formed by the piston 110 and the bore 114. An inner surface 126 of the piston 110 is exposed to the fluid chamber 116. The gas in the fluid chamber 116 may enter the piston cavity 111 from the fluid chamber 116. When installed, a bottom surface 122 of the piston plug 100 is exposed to the piston cavity 111 and a top surface 120 of the piston plug 100 may be flush with the outer surface 124 of the piston 110. When the pressure of the gas in the piston cavity 111 reaches or exceeds a predetermined value, the ball 102 is dislodged from its seat (for example, formed via the shoulder in the through hole 108) and the gas in the piston cavity 111 escapes via the piston plug 100. The through hole 108 provides a straight (collinear) flowpath for the gas in the piston cavity 111 to escape.

Because the through hole 108 of the piston plug 100 forms a flowpath 118 that is straight (collinear), debris inside the piston cavity 111 exits along with the gas in the piston cavity 111. Also, the high-speed, high-pressure operation of the reciprocating compressor may cause frequent breaking of the spring 104. Since the flowpath 118 through the piston plug 100 is collinear and extends along the direction of motion of the piston 110 in the cylinder 112, spring fragments may also exit the piston plug 100 via the through hole 108.

Accordingly, there is a need for a piston plug that vents the piston cavity and also prevents debris from exiting the piston.

SUMMARY

Embodiments of the disclosure may provide a piston plug. The piston plug may have a cylindrical body having a longitudinal axis and an outer cylindrical surface extending longitudinally between a first surface and a second surface. The second surface may be opposite the first surface. The outer cylindrical surface may define a hole extending radially inward. The hole may have a central axis perpendicular to the longitudinal axis of the cylindrical body. The piston plug may further include a first channel and a second channel, both defined by the cylindrical body. The first channel may be in fluidic communication with the first surface and the hole. The second channel may be in fluidic communication with the second surface and the hole. The first channel, the second channel, and at least a portion of the hole may form a non-collinear flowpath.

Embodiments of the disclosure may provide a valve for regulating flow of fluid. The valve may define an inlet channel configured to accept the fluid. The inlet channel may terminate in a hole defined in the valve and extending radially inward from an outer surface of the valve. The hole may have a central axis perpendicular to a longitudinal axis of the valve. The valve may also define an outlet channel configured to eject the fluid. The outlet channel may also terminate in the hole. The inlet channel, the hole, and the outlet channel may form a non-collinear flowpath.

Embodiments of the disclosure may provide a reciprocating compressor. The reciprocating compressor may include a housing having a bore, a piston slidably disposed in the bore, and a piston plug disposed in the piston. The piston and the bore may define a chamber therebetween. The piston may have an inner surface in fluidic communication with the chamber and an outer surface opposite the inner surface. The piston plug may be disposed in a plug hole defined on the outer surface of the piston. The piston plug may be retained in the plug hole via an interference fit between the piston plug and the plug hole. Further, the piston plug may define a non-collinear flowpath configured to restrict non-fluidic material from passing therethrough.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

FIG. 2B illustrates a cross-sectional view of the piston plug of FIG. 2A, according to example embodiments disclosed.

FIG. 2C illustrates the piston plug of FIGS. 2A and 2B with the ball, spring and fastener removed, according to example embodiments disclosed.

DETAILED DESCRIPTION

Figure 1A:
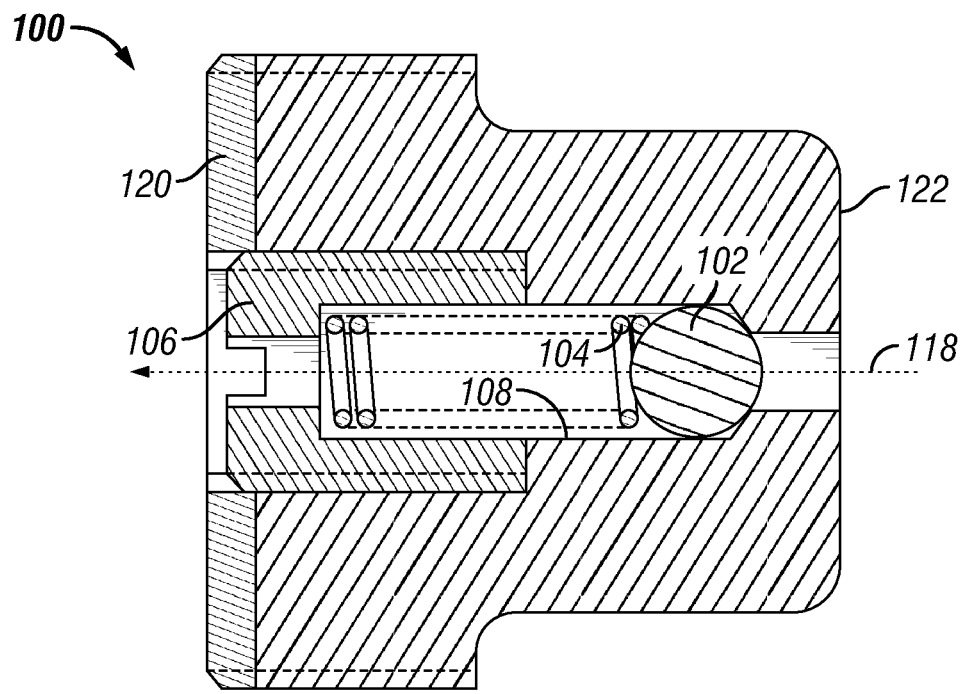
FIG. 1A illustrates a cross-sectional view of a conventional piston plug.
Figure 1B:
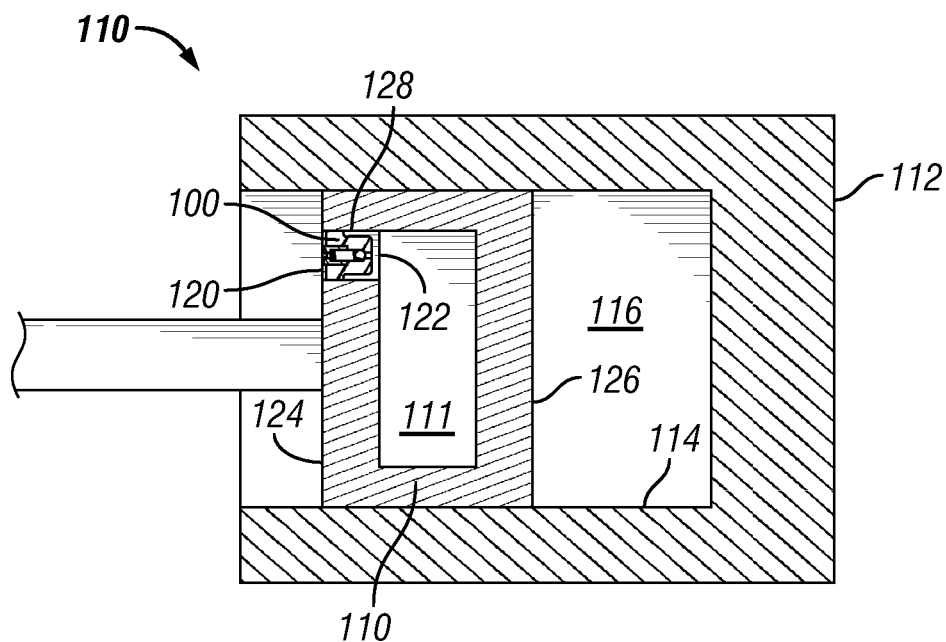
FIG. 1B illustrates a cross-sectional view of a piston having the conventional piston plug of FIG. 1A installed therein.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 2A:
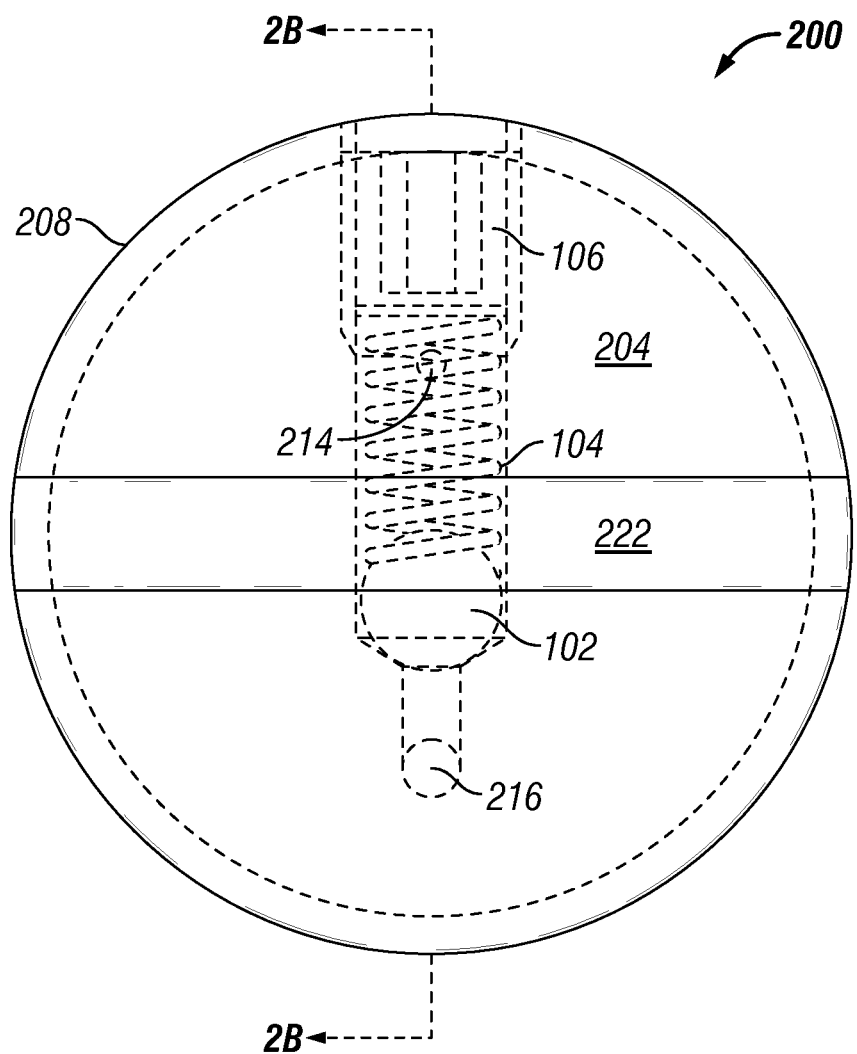
FIG. 2A illustrates a top view of a piston plug, according to example embodiments disclosed.

FIG. 2A illustrates a top view of a piston valve or plug 200, according to example embodiments disclosed. The piston plug 200 may have a generally cylindrical body defining a longitudinal axis 202 (FIG. 2C) and having a top surface 204, a bottom surface 206 (FIGS. 2B and 2C), and an outer cylindrical surface 208. Also illustrated in phantom, are the ball 102 and the spring 104 secured in the piston plug 200 via the fastener 106. The fastener 106 may be any conventional fastener such as a screw, nut, plug, or the like that may secure the ball 102 and the spring 104 in a partially drilled hole 210 of the piston plug 200 (see below).

FIG. 2B illustrates a sectional view of the piston plug 200 taken along the line 2B-2B in FIG. 2A, according to example embodiments disclosed. The piston plug 200 may define a blind hole or a partially drilled hole 210 having a central axis 212 perpendicular to the longitudinal axis 202 (FIG. 2C) of the piston plug 200. A blind hole or a partially drilled hole may refer to a hole that is reamed, drilled, or milled to a specified depth, thus without breaking through to the other side of a workpiece, herein, the piston plug 200. The partially drilled hole 210 may be at least partially defined by the outer cylindrical surface 208 of the piston plug 200. As illustrated, a first channel 214 may be formed in the piston plug 200. The first channel 214 may be in fluidic communication with the partially drilled hole 210 and the top surface 204 of the piston plug 200. Returning briefly to FIG. 2A, FIG. 2A illustrates the opening of the first channel 214 on the top surface 204 of the piston plug 200. Referring to FIG. 2B, a second channel 216 may be formed in the piston plug 200. As illustrated, the second channel 216 may be an L-shaped channel in fluidic communication with a bottom 218 of the partially drilled hole 210 and the bottom surface 206 of the piston plug 200.

As illustrated in FIG. 2B and more clearly in FIG. 2C, the bottom 218 of the partially drilled hole 210 may define an angle $\alpha$ with the inner sidewall 228 (FIG. 2C) of the partially drilled hole 210, thereby providing a seat for the ball 102. In an exemplary embodiment, the angle $\alpha$ is of about 118°; however, embodiments in which angle $\alpha$ is greater or lesser than 118° are contemplated herein. Accordingly, in an embodiment, angle $\alpha$ may range from about 114° to about 120°. FIG. 2C illustrates the piston plug 200 of FIG. 2B with the ball 102, spring 104, and the fastener 106 removed. FIG. 2C illustrates a flowpath 220 formed by the first channel 214, the second channel 216, and at least a portion of the partially drilled hole 210.

As seen in FIGS. 2B and 2C, the flowpath 220 in the piston plug 200 is not straight or collinear (for example, includes bends or turns). In contrast, the flowpath 118 in the conventional piston plug 100 is a straight path (collinear) through the piston plug 100. This flowpath 220, also referred to as a labyrinth type flowpath, may prevent debris and other non-fluidic material (for example, material other than gas or liquid) from exiting the piston 110. Further, the orientation (perpendicular to the motion of the piston 110 and the longitudinal axis 202) of the ball 102 and the spring 104 in the partially drilled hole 210 may reduce an inertial force acting on the ball 102 and the spring 104, thereby reducing the failure rate of the spring 104.

As seen in FIGS. 2A-2C, the top surface 204 of the piston plug 200 may have a notch 222 designed to facilitate screwing of the piston plug 200 into the piston 110. It should be noted that, when installed in the piston 110, the piston plug 200 may be orientated in the same way as the piston plug 100 in the piston 110, and the top surface 204 of the piston plug 200 may be flush with the outer surface 124 of the piston 110.

Figure 3A:
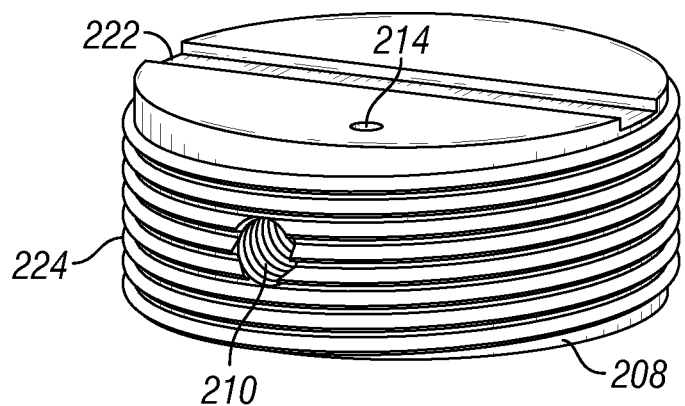
FIG. 3A illustrates the piston plug of FIGS. 2A-2C having a straight thread, according to example embodiments disclosed.

FIG. 3A illustrates the piston plug 200 having a straight thread 224 on the outer cylindrical surface 208, according to example embodiments disclosed. The straight thread 224 may be a nonstandard straight thread. As is know, thread profiles, for example, the major diameter, the pitch diameter, and the like, are calculated as per standards set forth by an international standard-setting body, for example, the International Organization for Standardization (ISO). A straight thread having profiles based on these standards may be referred to as a standard straight thread. In the instant case, the straight thread 224 is a nonstandard straight thread, since the profiles of the straight thread 224 may not adhere to the defined standards. For example, the straight thread 224 may have a pitch diameter greater than a pitch diameter calculated as per the standard. In another example embodiment, the major diameter or any other thread profile may be varied from the defined standard to create a nonstandard straight thread.

However, the threads in the plug hole 128 of the piston 110 may be standard straight threads (for example, class 3 threads). As a result, when the piston plug 200 is screwed in piston 110, interaction between the standard threads of the plug hole 128 and the nonstandard threads of the piston plug 200 may provide an interference fit therebetween. As a result of the interference fit, the piston plug 200 may be secured in the piston 110 without requiring any additional mechanical and/or chemical methods. In contrast, since the conventional piston plug 100 has a standard thread, additional mechanical and/or chemical methods are required to secure the conventional piston plug 100 in the piston 110. For example, an additional mechanical method may include peening the piston plug 100 to secure the piston plug 100 in the piston 110. Since no additional mechanical and/or chemical methods are required to secure the piston plug 200, manufacturing time may be reduced.

Figure 3B:
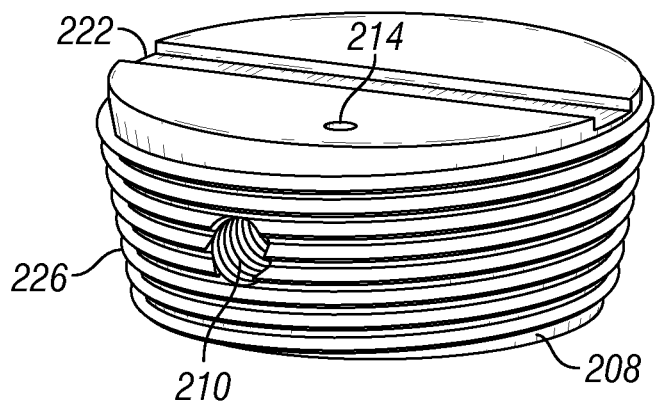
FIG. 3B illustrates the piston plug of FIGS. 2A-2C having a tapered thread, according to example embodiments disclosed.

FIG. 3B illustrates the piston plug 200 having a tapered thread 226 as defined by the National Pipe Thread Taper (NPT) standard, according to example embodiments disclosed. When a piston plug having tapered thread is used, the threads in the plug hole may also be correspondingly tapered to accept the piston plug. In contrast to standard straight threads, a tapered thread 226 will pull tight when screwed and therefore make a fluid-tight seal. Regardless of the type of thread on the piston plug 200, it should be noted that, when installed, the top surface 204 of the piston plug 200 is flush with the outer surface 124 of the piston 110.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. A reciprocating compressor piston, the piston comprising:
   a piston cavity defined by the piston, wherein the piston is connected to a crankshaft and responsive to reciprocating motion from the crankshaft; and
   a piston plug for venting gaseous working fluid from the piston cavity while restricting exit of non-fluidic debris material from the piston cavity, the piston plug installed in a plug hole defined by an outer surface of the piston, wherein the piston plug, comprises:
   a cylindrical body having a longitudinal axis and an outer cylindrical surface extending longitudinally between a first surface and a second surface opposite the first surface, the outer cylindrical surface defining a hole extending radially inward, such that the hole has a central axis perpendicular to the longitudinal axis of the cylindrical body;
   a first channel in fluidic communication with the first surface and the hole;
   a second channel in fluidic communication with the second surface and the hole, the first channel, the second channel, and at least a portion of the hole forming a non-collinear flowpath;
   a first straight thread defined on the outer cylindrical surface and having a first thread profile, the first straight thread configured to provide an interference fit with a second straight thread defined on an inner surface of the plug hole where the piston plug is installed, the second straight thread having a second thread profile that is different than the first thread profile;
   a ball and a spring disposed in the hole,
   wherein, when a pressure of gaseous working fluid in the cavity defined by the piston of the reciprocating compressor reaches or exceeds a predetermined value, the ball is dislodged from a valve seat and gaseous working fluid in the piston cavity escapes via the non-collinear flowpath in the piston plug,
   wherein the non-collinear flowpath is effective to prevent non-fluidic material from exiting the piston of the reciprocating compressor along with the gaseous working fluid that escapes via the non-collinear flowpath;
   a fastener disposed in the hole and configured to retain the ball and the spring in the hole; and
   wherein when the piston plug is installed in the piston, the first surface is flush with an outer surface of the piston,
   wherein a notch diametrically traverses from side-to-side the first surface of the piston plug, the notch defined by a cross-section centrally arranged relative to the longitudinal axis of the piston plug, the notch arranged to apply a screwing rotation about the central axis to the piston plug so that, when the piston plug is being installed in the piston, the piston plug is rotated relative to the plug hole in the piston and thus effect the interference fit of the first straight thread with the second straight thread defined on the inner surface of the plug hole, wherein the non-collinear flowpath is configured to restrict the exit of the non-fluidic debris material from the piston cavity,
   wherein the second channel constitutes an inlet channel to receive the gaseous working fluid in the position cavity into the non-collinear flowpath, and wherein the first channel constitutes an outlet channel for gaseous working fluid exiting the non-collinear flowpath through the piston plug,
   wherein the inlet channel extends along a longitudinal channel axis offset from the longitudinal axis of the piston plug and spaced-apart form the notch.

2. The piston plug of claim 1, wherein the hole is a partially drilled hole and a bottom of the partially drilled hole forms an angle of 114° to 120° with an inner sidewall of the partially drilled hole.

3. The piston plug of claim 2, wherein the first channel is in fluidic communication with the inner sidewall of the partially drilled hole and the second channel is in fluidic communication with the bottom of the partially drilled hole.

4. A reciprocating compressor, comprising:
   a housing having a bore;

a piston slidably disposed in the bore, the piston connected to a crankshaft and responsive to reciprocating motion from the crankshaft, the piston comprising a piston cavity, wherein the piston and the bore define a chamber therebetween, the piston having an inner surface in fluidic communication with the chamber and an outer surface opposite the inner surface; and a piston plug for venting gaseous working fluid from the piston cavity while restricting exit of non-fluidic debris material from the piston cavity, the piston plug disposed in a plug hole defined on the outer surface, the piston plug being retained in the plug hole via an interference fit between the piston plug and the plug hole, and the piston plug defining a non-collinear flowpath configured to restrict non-fluidic material from passing therethrough, the piston plug comprising:

a cylindrical body having a longitudinal axis and defining:

a partially drilled hole extending radially inward from an outer cylindrical surface of the cylindrical body, the partially drilled hole having a central axis perpendicular to the longitudinal axis, a first channel in fluidic communication with a first circular surface of the cylindrical body and the partially drilled hole, a second channel in fluidic communication with a second circular surface of the cylindrical body and the partially drilled hole, the second circular surface being opposite the first circular surface, and a first straight thread defined on the outer cylindrical surface and having a first thread profile, the first straight thread configured to provide the interference fit with a second straight thread defined on an inner surface of the plug hole, the second straight thread having a second thread profile that is different than the first thread profile;

a ball and a spring disposed in the hole, wherein, when a pressure of gaseous working fluid in the cavity defined by the piston of the reciprocating compressor reaches or exceeds a predetermined value, the ball is dislodged from a valve seat and gaseous working fluid in the piston cavity escapes via the non-collinear flowpath in the piston plug, wherein the non-collinear flowpath is effective to prevent the non-fluidic debris material from exiting the piston of the reciprocating compressor along with the gaseous working fluid that escapes via the non-collinear flowpath;

a fastener disposed in the hole and configured to retain the ball and the spring in the hole, wherein at least a portion of the partially drilled hole, the first channel, and the second channel form the non-collinear flowpath; and wherein when the piston plug is installed in the piston, the first circular surface is flush with the outer surface of the piston, wherein a notch diametrically traverses the first surface, the notch arranged to apply a screwing rotation about the central axis to the piston plug so that, when the piston plug is being installed in the piston, the piston plug is rotated relative to the plug hole in the piston and thus effect the interference fit of the first straight thread with the second straight thread defined on the inner surface of the plug hole, wherein a notch diametrically traverses from side-to-side the first surface of the piston plug, the notch defined by a cross-section centrally arranged relative to the longitudinal axis of the piston plug, wherein the second channel constitutes an inlet channel to receive the gaseous working fluid in the position cavity into the non-collinear flowpath, and wherein the first channel constitutes an outlet channel for gaseous working fluid exiting the non-collinear flowpath through the piston plug, wherein the inlet channel extends along a longitudinal channel axis offset from the longitudinal axis of the piston plug and spaced-apart form the notch.

5. The reciprocating compressor of claim 4, wherein a bottom of the partially drilled hole forms an angle in a range from 114° to 120° with an inner sidewall of the partially drilled hole, and wherein the first channel is in fluidic communication with the inner sidewall of the partially drilled hole and the second channel is in fluidic communication with the bottom of the partially drilled hole.

\* \* \* \* \*